(12) United States Patent
Cripps et al.

(10) Patent No.: US 7,726,630 B2
(45) Date of Patent: Jun. 1, 2010

(54) SOLENOID VALVE

(75) Inventors: Brian M. Cripps, Bristol, CT (US);
Dennis Mudge, Rocky Hill, CT (US);
Kevin Wilson, Somers, CT (US)

(73) Assignee: Parker-Hannifin Corporation,
Cleveland, OH (US)

( * ) Notice: Subject to any disclaimer, the term of this patent is extended or adjusted under 35 U.S.C. 154(b) by 267 days.

(21) Appl. No.: 11/419,633

(22) Filed: May 22, 2006

(65) Prior Publication Data

US 2006/0284130 A1 Dec. 21, 2006

Related U.S. Application Data

(60) Provisional application No. 60/682,907, filed on May 20, 2005, provisional application No. 60/777,401, filed on Feb. 28, 2006.

(51) Int. Cl.
*F16K 31/02* (2006.01)
(52) U.S. Cl. ................... 251/129.15; 251/332
(58) Field of Classification Search ............ 251/129.15, 251/359, 332
See application file for complete search history.

(56) References Cited

U.S. PATENT DOCUMENTS

| | | | | |
|---|---|---|---|---|
| 3,640,501 A * | 2/1972 | Walton | ................... | 251/332 |
| 4,074,700 A * | 2/1978 | Engle | ................... | 137/625.27 |
| 4,308,891 A | 1/1982 | Loup | ................... | 137/551 |
| 4,418,720 A | 12/1983 | Day et al. | ................... | 137/625.65 |
| 4,454,381 A | 6/1984 | Ito et al. | ................... | 174/151 |
| 4,538,645 A * | 9/1985 | Perach | ................... | 137/625.65 |
| 4,723,230 A | 2/1988 | Chelminski | ................... | 367/20 |
| 4,825,973 A | 5/1989 | Harrison | ................... | 181/120 |
| 4,892,285 A | 1/1990 | Torrence | ................... | 251/129.05 |
| 4,954,799 A * | 9/1990 | Kumar | ................... | 335/236 |
| 5,188,017 A | 2/1993 | Grant et al. | ................... | 91/459 |
| 5,192,048 A | 3/1993 | Wakeman | ................... | 251/129.16 |
| 5,244,180 A | 9/1993 | Wakeman et al. | ................... | 251/129.16 |
| 5,544,857 A * | 8/1996 | Torrence | ................... | 251/129.15 |
| 5,722,634 A | 3/1998 | Hrytzak et al. | ................... | 251/129.15 |
| 5,865,213 A * | 2/1999 | Scheffel et al. | ................... | 137/614.16 |
| 6,050,542 A | 4/2000 | Johnson et al. | ................... | 251/129.15 |
| 6,079,435 A | 6/2000 | Franz et al. | ................... | 137/82 |
| 6,086,042 A * | 7/2000 | Scott et al. | ................... | 251/129.15 |
| 6,405,752 B1 * | 6/2002 | Fritsch et al. | ................... | 137/550 |
| 6,463,951 B2 | 10/2002 | Shost | ................... | 137/15.18 |

* cited by examiner

*Primary Examiner*—John K Fristoe, Jr.
(74) *Attorney, Agent, or Firm*—Renner, Otto, Boisselle & Sklar, LLP

(57) ABSTRACT

A valve flow-directing vessel (42) comprising a sleeve (44) having a threaded installation portion (84) for connection to a receiving member, a plunger (46) movable within the sleeve (44) between a closed position and an opened position, and an orifice insert (48/50) fixedly attached to the sleeve (44). The orifice insert (48/50) defines an orifice (132) that is sealed when the plunger (46) is in the closed position and unsealed when the plunger (46) is in the opened position. The orifice (132) is the entrance to a passageway (130) having an exit (134) communicating with a delivery passage of the receiving member, and this exit (134) is positioned beyond the threaded installation portion (84) of the sleeve (44).

23 Claims, 4 Drawing Sheets

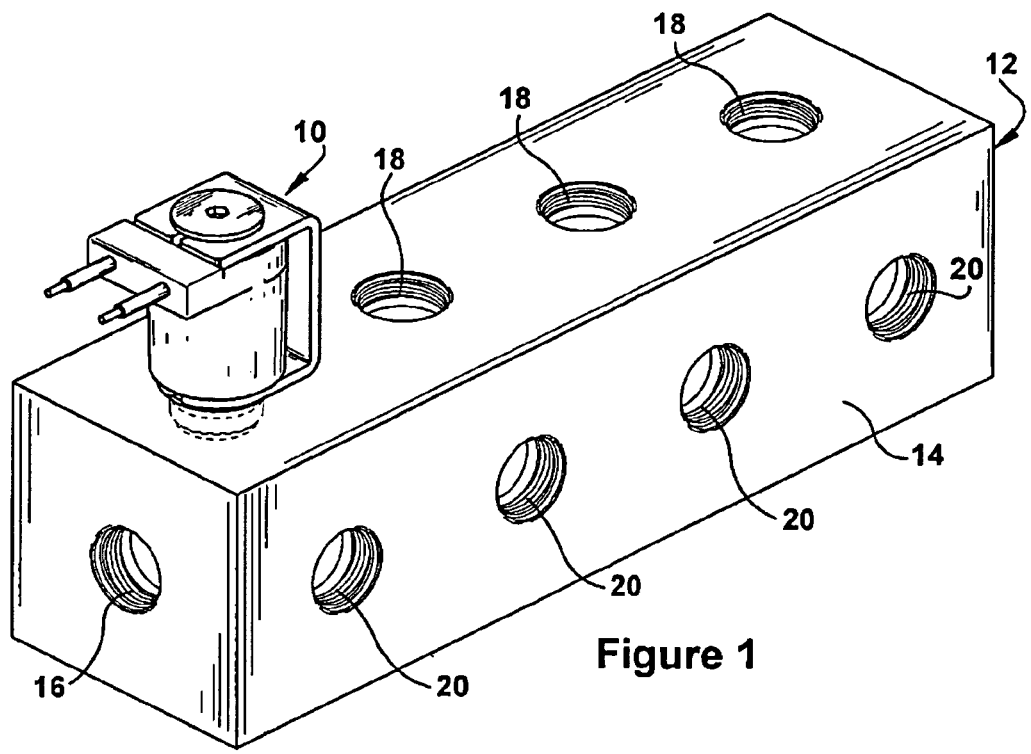
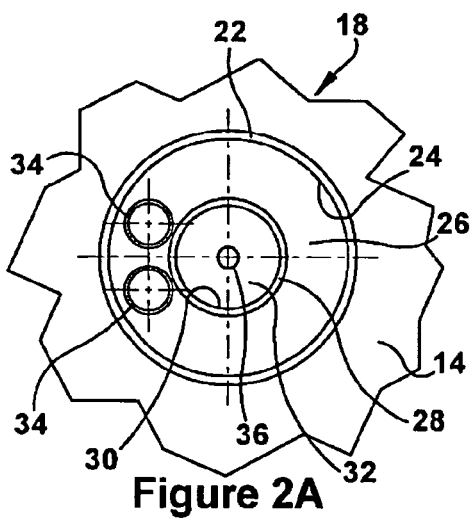
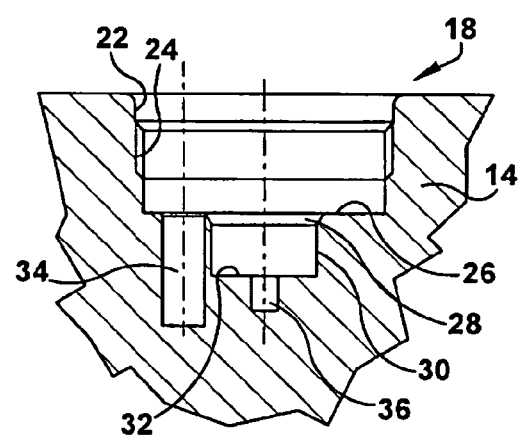

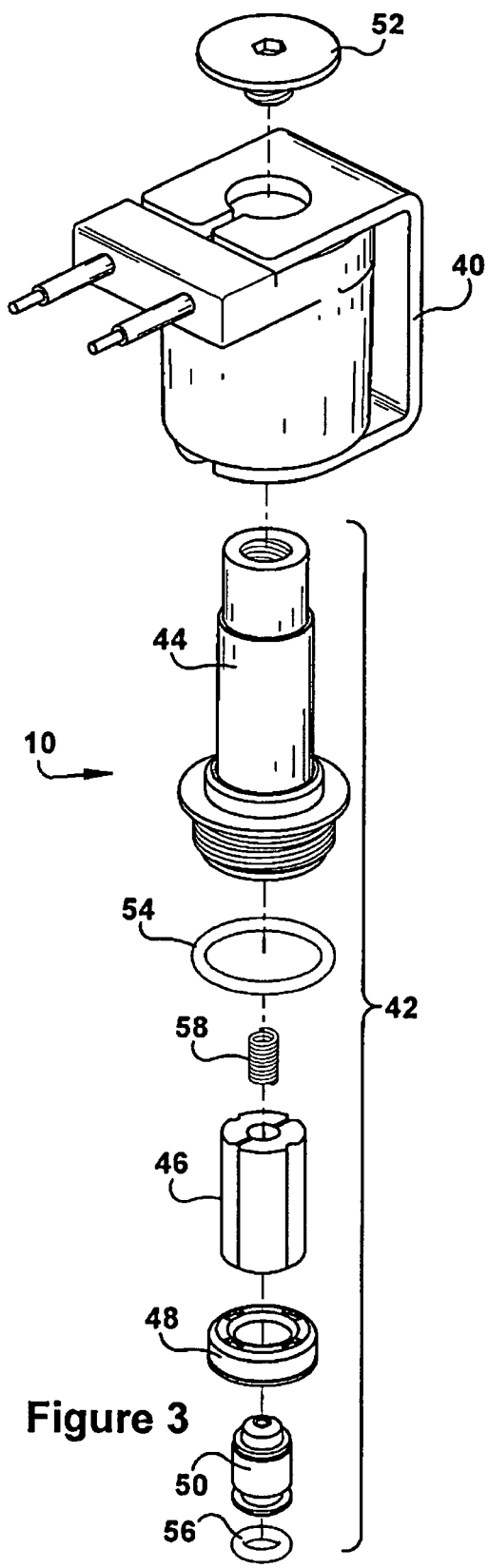
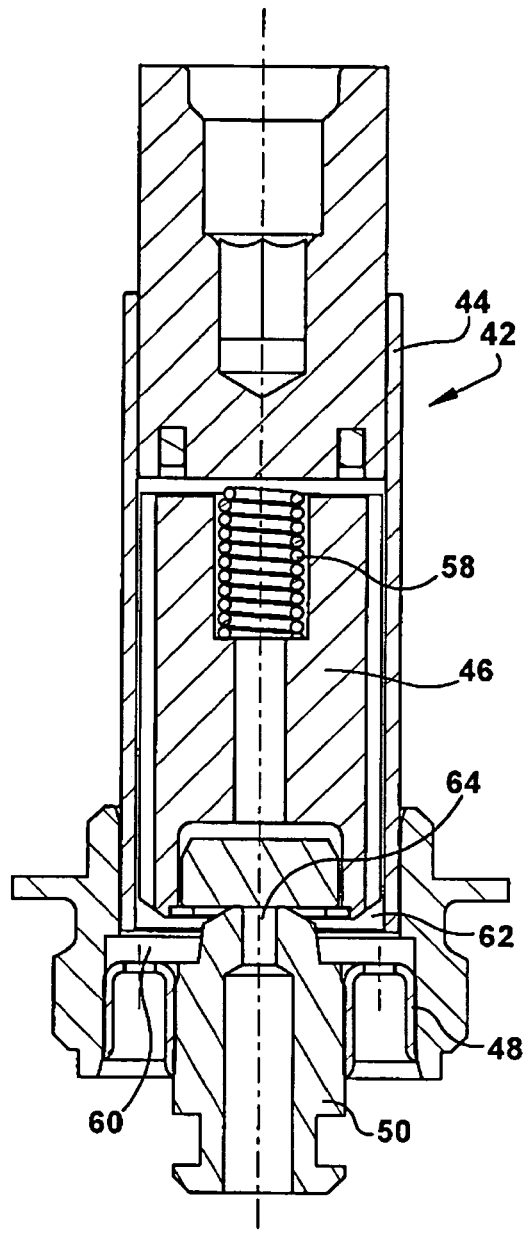
Figure 3
Figure 4

SOLENOID VALVE

RELATED APPLICATIONS

This application claims priority under 35 U.S.C. §119 (e) to U.S. Provisional Patent Application No. 60/682,907 filed on May 20, 2005 and U.S. Provisional Patent Application No. 60/777,401 filed on Feb. 28, 2006. The entire disclosures of these provisional applications are hereby incorporated by reference.

GENERAL FIELD

This disclosure relates generally to a solenoid valve and, more particularly, to a solenoid valve installed in a valve-receiving member (e.g., a manifold) to control the delivery of fluid.

BACKGROUND

A solenoid valve commonly comprises a solenoid assembly and a flow-controlling vessel which controls flow in response to energization of the solenoid assembly. The flow-controlling vessel can include a sleeve and a seal-carrying plunger that moves between a closed position and an opened position within the sleeve. For example, when the solenoid assembly is energized, the plunger can be motivated to move from a closed position to an opened position and, when the solenoid assembly is de-energized, the plunger can be mechanically biased to return to the closed position.

A solenoid valve is often used with a valve-receiving member, such as a manifold, to selectively deliver fluid to a particular piece of equipment. A receiving member can include one or more supply lines, one or more interfacing cavities, and one or more delivery lines. The interfacing cavities can each includes a passage communicating with the supply line (s) and a passage communicating with the delivery line(s). The valve, when in an open condition, forms a flow path from the supply line(s) to the respective delivery line(s) so that fluid can be provided to the corresponding equipment.

The sleeve of the valve has an installation portion which mates with a valve-installation portion of the interfacing cavity to create a fluid-tight connection therebetween. Typically, for example, the sleeve has external threads and the interfacing cavity has corresponding internal threads whereby the valve may be screwed into the receding member. In any event, when the valve is installed in the receiving member, a flow path is formed between the supply line and the respective delivery line, and an orifice forms part of this flow path. When the plunger is in the closed position, it seals the orifice and no fluid is delivered to the equipment. When the plunger is in the opened position, it does not seal the orifice and fluid is delivered to the equipment via the delivery line. Thus, by selectively energizing and/or de-energizing the solenoid assembly, the flow of fluid to the equipment can be controlled.

The orifice, and the seal-seating area surrounding the orifice, are often very important to the proper operation of a valve. In many instances, the dimensions of the orifice and seating area must be very precise, and within very tight tolerances, to insure the necessary accuracy of flow rate and/or other parameters. Particularly, for example, the diameter of the orifice and the curvature of the surrounding edge, are often critical to obtaining correct flow characteristics. Thus, these elements must be machined or otherwise made under extreme accuracy. Moreover, as the durability of the orifice and seating area essentially dictates the life of the valve, these elements must be able to maintain this accuracy.

SUMMARY

The flow-controlling vessel of a solenoid valve comprises a sleeve having a installation portion for connection to a receiving member (e.g., a manifold), a plunger movable within the sleeve between a closed position and an opened position, and an orifice insert fixedly attached to the sleeve. The sleeve and/or the orifice insert define a fluid chamber, an inlet into the fluid chamber, an outlet from the fluid chamber, a flow path from the inlet through the flow chamber to the outlet. The orifice insert includes an orifice and a seating area surrounding the orifice. The orifice is sealed when the plunger is in the closed position and unsealed when the plunger is in the opened position.

In contrast to the widely accepted practice of the orifice being part of the receiving member, with the insert the orifice is part of the valve package. As such, the manufacturer of the receiving member need not concern itself with precise dimensions and/or very tight tolerances when fabricating the passages in the interfacing cavity. With a multi-cavity design, which is very common, this eliminates the situation where an entire block has to be scrapped because even just one orifice has not been machined to specifications.

With the orifice insert, the construction of the flow-directing vessel can include the incorporation of the orifice. This allows the valve manufacturer to calibrate flow characteristics at the factory and confirm that the valve will indeed meet particular parameters. When the orifice is instead part of the receding member, the valve manufacturer is at the mercy of the manufacturer of the receiving member as to whether strict flow specifications will be satisfied upon installation of the valve in the receiving member.

The orifice insert also allows the critical orifice-carrying component of the vessel, and only this component, to be made of a long-life material, such as stainless steel. The other vessel components can be made of more economic materials without compromising the life of the valve. For the same reason, the receiving member can be machined from a cheaper block material and this, in combination with the loosening of tolerances, can have a significant impact on manufacturing costs.

The orifice insert additionally makes a modular-like manufacturing process possible, as inserts with different orifice sizes can be compatible with the same vessel design. Thus a family of valves, with varying flow characteristics, can be made by using the same vessel design with different orifice inserts. For this same reason, after-construction adjustments can be more easily accommodated if, for example, field use a valve reveals that the specified flow parameters (although met by the valve) are not optimum due to equipment derivations and/or deviations.

The orifice insert further allows the flow-controlling vessel to be constructed with only one threaded portion, namely an externally threaded member-installation portion which mates with corresponding internal threads in the interfacing cavity. The threaded connection of a separate orifice-carrying piece (which requires two additional threaded portions) is not necessary. This can represent a significant savings to the valve manufacturer because, as a general rule, less threads translates into lower tooling costs. Also, unlike a separate orifice-carrying piece, the insert does undesirably increase the package size (e.g., height) of the valve.

These and other features are fully described and particularly pointed out in the claims. The following description and annexed drawings set forth in detail a certain illustrative embodiment that is indicative of but one of the various ways in which the principles may be employed.

DRAWINGS

FIG. 1 is a perspective view of the valve installed in a multi-cavity receiving member.

FIG. 2A is a top view of a valve-interfacing cavity of the receiving member.

FIG. 2B is a cross-sectional view of the valve-interfacing cavity.

FIG. 3 is an exploded view of the valve.

FIG. 4 is a cross-sectional view of the flow-directing vessel of the valve, this vessel including a sleeve, a plunger assembly, an inlet cup, and a flow-controlling capsule.

DETAILED DESCRIPTION

Figure 5:
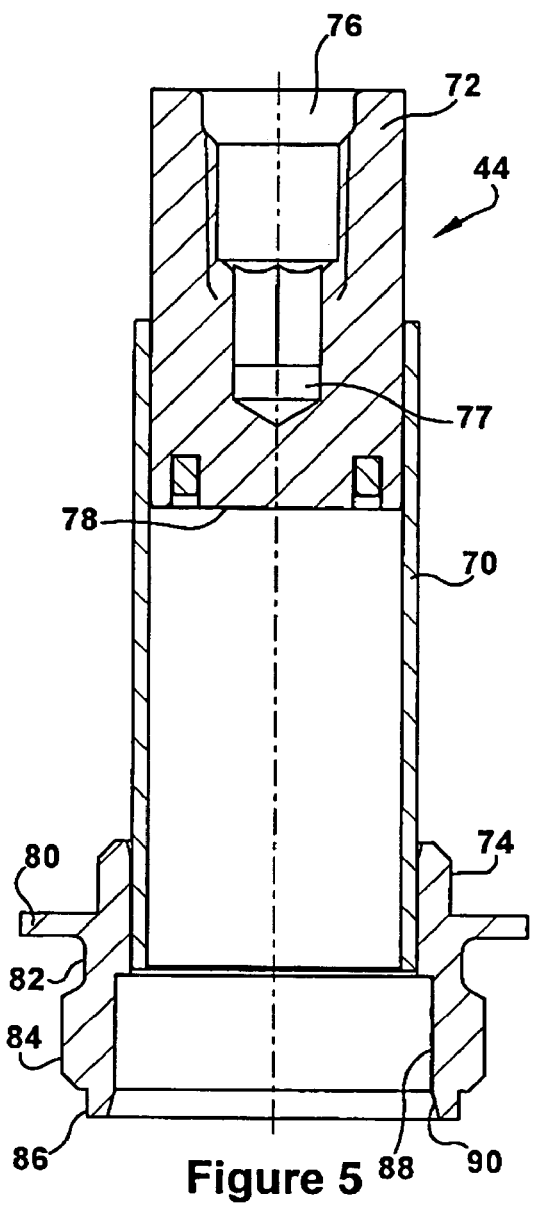
FIG. 5 is a cross-sectional view of the sleeve.

Referring now to the drawings in detail, and initially to FIG. 1, a solenoid valve 10 is shown installed on a receiving member 12. The receiving member 12 comprises a block 14, at least one fluid supply line 16, at least one valve-interfacing cavity 18, and at least one fluid delivery line 20. In the illustrated embodiment, the member 12 has four interfacing cavities 18, with a common supply line 16 and a delivery line 20 for each cavity 18. However, a receiving member 12 wherein each interfacing cavity 18 has its own supply line(s) and/or wherein a plurality of the cavities 18 have a common delivery line 20 or multiple delivery lines, is certainly possible and contemplated.

In operation, a source of the fluid is connected to the supply line(s) 16 and the delivery line(s) 20 are connected to the relevant equipment. The valve 10, when in an open condition, forms a flow path from the supply line(s) 16 to the respective delivery line 20(s) so that the fluid can be provided to the equipment. The valve 10, when in a closed condition, obstructs this flow path so that fluid is not supplied to the equipment.

Referring now to FIGS. 2A and 2B, the interfacing cavity 18 of the receiving member 12 is shown in more detail. The illustrated interfacing cavity 18 generally comprises an upper cylindrical portion, which is defined by a sealing surface 22, a threaded cylindrical wall 24, and a bottom annular wall 26, and a lower cylindrical portion, which is defined by a lead-in chamfer 28, a sealing surface 30, and a bottom circular wall 32. The interfacing cavity 18 includes supply passages 34 communicating with the supply line 16 and a delivery passage 36 communicating with the respective delivery line 20. The supply passages 34 are located on the upper bottom wall 26 and the delivery passage 36 is located on the lower bottom wall 32. Both the passage 34 and the passage 36 are positioned below (or deeper than) the threaded cylindrical wall 24 in the interfacing cavity 18.

Referring now to FIG. 3, the components of the valve 10 are shown. The valve 10 generally comprises a solenoid assembly 40 and a flow-directing vessel 42. The flow-directing vessel 42 comprises a sleeve 44, a plunger 46, an inlet cup 48, and a flow-controlling capsule 50. The illustrated valve 10 additionally includes a fastener 52 for attaching the solenoid assembly to the flow-directing vessel 42, and seals 54 and 56 for connecting the vessel 42 to the receiving member 12 in a fluid-tight manner. The vessel 42 (and/or the plunger 46) can include a spring 58 for mechanically biasing the plunger 46 to a particular position.

Referring now to FIG. 4, the flow-directing vessel 42, is shown in an assembled condition and isolated from the rest of the valve 10. The plunger 46 and the spring 58 are situated within the sleeve 44 and the plunger 46 is movable between a closed position and an opened position. The inlet cup 48 and the flow-controlling capsule 50 are attached to the open end of the sleeve 44. More specifically, the inlet cup 48 and the flow-controlling capsule 50, which may be collectively referred to as an orifice insert, are press-fit into the sleeve 44. No threaded connections are necessary between the cup 48 and the sleeve 44 and/or between the cup 48 and the capsule 50.

The sleeve 44, the cup 48, and/or the capsule 50 define an inlet 60, a fluid chamber 62, an outlet 64, and a flow path from the inlet 60 through the flow chamber 62 to the outlet 64. When the valve 10 is installed on the receiving member 12, the inlet 60 and the outlet 64 communicate, respectively, with the supply passages 34 and the delivery passage 36 of the interfacing cavity 18, thereby defining a flow path from the supply passages 34 to the delivery passage 36.

When the solenoid assembly 40 is not energized, the plunger 46 is biased by the spring 58 to its closed position, thereby sealing the outlet 64 and preventing the flow of fluid therethrough to the delivery passage 36 of the interfacing cavity 18. Thus, fluid is not supplied to the connected equipment. When the solenoid assembly 40 is energized, the magnetic force overcomes the biasing force of the spring 58 and the plunger 46 is moved to its opened position. The movement of the plunger 46 results in the outlet 64 no longer being obstructed, whereby fluid can flow therethrough to the delivery passage 36 and then to the delivery line 20 for conveyance to the equipment.

The sleeve 44, shown in FIG. 5, generally comprises a tube 70, a stop cylinder 72 closing the upper end of the tube 70, and a flange 74 surrounding the lower end of the tube 70. The stop 72 has bore with an upper internally threaded region 76 for receipt of the solenoid-to-vessel fastener 52. A lower region 77 of the bore has a hexagonal cross-sectional shape for receipt of a hex wrench. It may be convenient for the fastener 52 to have a wrench-receiving recess on its head, of the same dimensions as the region 77, so that the same wrench can be used both to install the vessel 42 and assemble the solenoid assembly 40. The lower axial surface 78 of the stop 72 (located within the tube 70) serves as a stop for the plunger 46 and/or as a brace for the spring 58.

The outer profile of the flange 74 comprises a rim 80, a groove 82 for receipt of the seal 54, an externally threaded boss 84, and a pedestal 86. When the valve 10 is installed in the receiving member 12, the boss 84 screws into the threaded wall 24 of interfacing cavity 18. This may be accomplished by insertion of a wrench into the hexagonal region 77 of the bore in the stop 72 and turning in the appropriate direction. It may be noted that this internal wrench surface eliminates the need for an external wrench surface on the sleeve 44, thereby simplifying fabrication and/or reducing package height. In any event, when the threads are fully mated, the rim 80 rests against the surface of the block 14 surrounding interfacing cavity 18, the seal 54 is situated within the sealing surface 22 of the interfacing cavity 18 and the pedestal 86 abuts against the cavity's annular wall 26. The seal 54 prevents fluid from leaking to the outside environment through the member-sleeve interface.

The inner profile of the flange 74 comprises a smooth cylindrical wall 88 and a radially outward flared skirt 90. The wall 88 extends downward from the lower edge of the tube 70 and defines a diameter slightly greater than the tube diameter. This interior geometry accommodates a press-fit attachment of the inlet cup 48 to the sleeve 44. As was alluded to above, no threads are necessary on the flange 74 and/or the cup 48 to accomplish the sleeve-to-cup attachment.

Figure 6A:
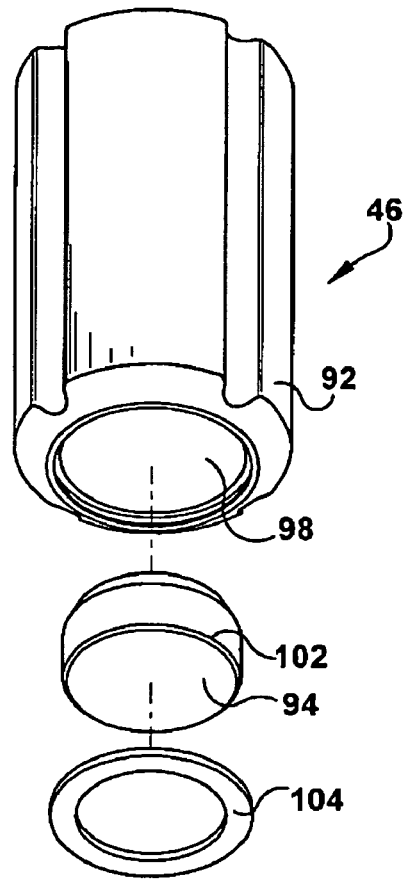
FIG. 6A is an exploded view of the plunger assembly.
Figure 6B:
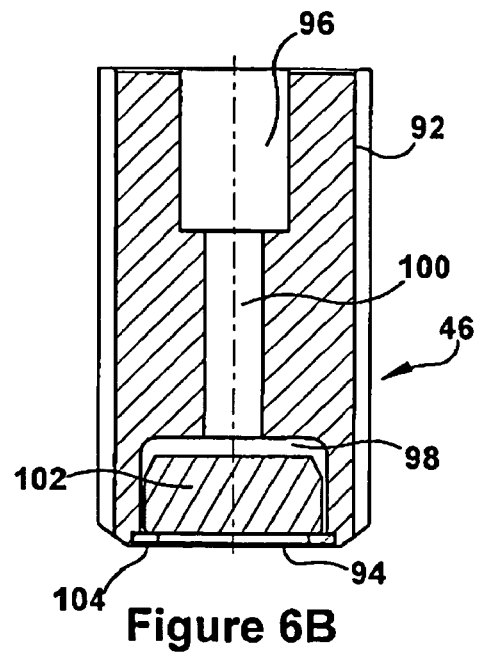
FIG. 6B is a cross-sectional view of the plunger assembly.

The plunger 46, shown in FIGS. 6A and 6B, comprises a plunger body 92 and a seal 94. The seal 94 is associated with the plunger body 92 in such a way that movement of the body 92 translates into movement of the seal 94. The seal 94 can be integrally formed, attached to, connected with, or otherwise incorporated into the structure of the plunger body 92. Alternatively, the seal 94 can be a separate piece which is pushed, pulled, or otherwise manipulated by movement the plunger body 92. In either or any event, in the plunger-closed position, the seal 94 seats against an orifice of the capsule 50 (namely orifice 132 introduced below) which forms the outlet 64 from the fluid chamber 62. In the plunger-opened position, the seal 94 is distanced from this orifice so as to allow the flow of fluid through the outlet 64.

The illustrated plunger body 92 comprises a bore 96 at its upper axial end, a cavity 98 at its lower axial end, and a channel 100 connecting the bore 96 to the cavity 98. The upper axial end of the body 92 abuts against the stop 78 of the stop 72 when the plunger 46 is in its opened position, thereby limiting its stroke within the sleeve 44. In the assembled valve 10 and/or vessel 42, the spring 58 is inserted into the bore 96 and is thereby confined between the bottom wall of the bore 96 and the stop surface 78 of the cylinder 72.

In the illustrated embodiment, the seal 94 is carried by a platform 102 which floats within the cavity 98 of the plunger body 92 and is maintained therein by a retainer 104. This floating arrangement, in combination with the pressure-equalization provided by the channel 100, can provide momentum and/or enhance the opening forces. However, such floating and/or pressure-equalization is not necessary and/or may not be desired in certain situations, and in any event, is not crucial to the construction or operation of the orifice insert (e.g., the cup 48 and the capsule 50).

Figure 7A:
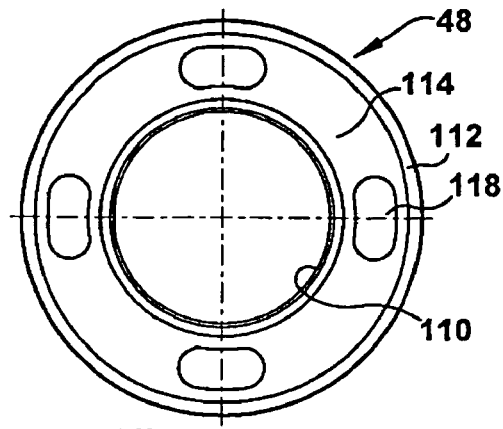
FIG. 7A is a bottom view of the inlet cup.
Figure 7B:
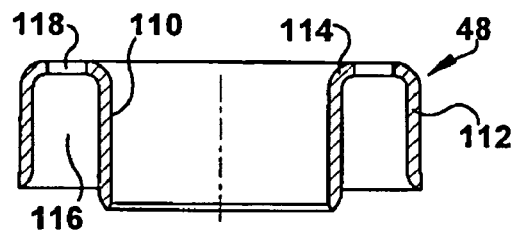
FIG. 7B is a sectional view of the inlet cup.

The inlet cup 48, shown in FIGS. 7A and 7B, comprises an inner cylindrical wall 110, an outer cylindrical wall 112, and a connecting wall 114 extending radially therebetween. The walls 110, 112, and 114 form an annular chamber 116 and openings 118 in the connecting wall 114 communicate with this chamber 116. In the assembled valve 10 and/or vessel 42, the chamber 116 communicates, via the openings 118, with the holding chamber 62. When the valve 10 is installed on the receiving member 12, the chamber 116 communicates, via the supply passages 34 in the interfacing cavity 18, with the supply line 16.

Figure 8A:
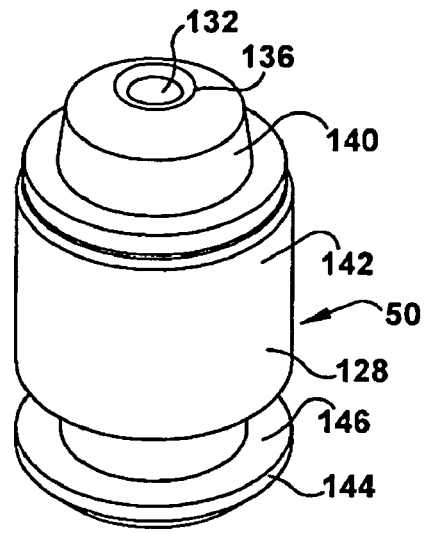
FIG. 8A is a perspective view of the flow-controlling capsule.
Figure 8B:
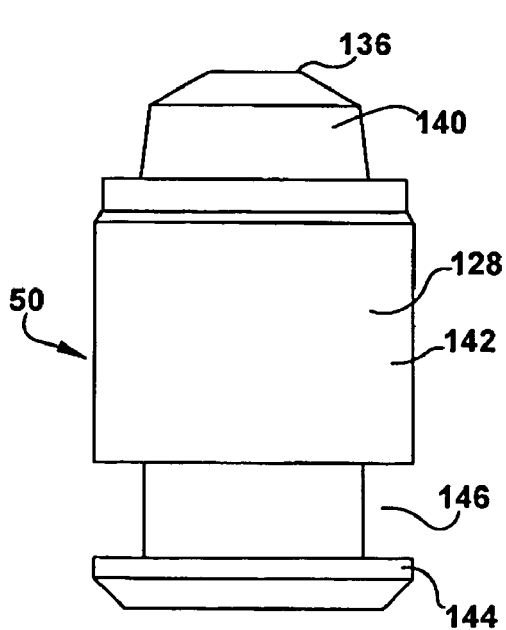
FIG. 8B is a front view of the flow-controlling capsule.
Figure 8C:
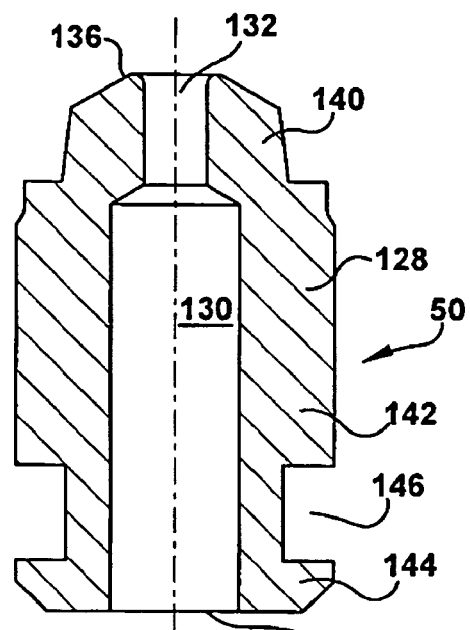
FIG. 8C is a cross-sectional view of the flow-controlling capsule.

The flow-controlling capsule 50, shown in FIGS. 8A-8C, comprises a body 128 having an outlet passage 130 extending axially between an entrance, specifically an orifice, 132 and an exit 134. It may be noted that the exit 134 is positioned below the installation portion (i.e., the boss 84) of the sleeve 44. In the assembled valve 10 and/or vessel 42, the outlet passage 130 communicates, via the orifice 132, with the holding chamber 62, when the plunger 46 is its opened position. When the valve 10 and/or vessel 42 is installed onto the receiving member 12, the capsule passage 130 communicates with the respective delivery line 20, via the exit 134 and the passage 36 in the interfacing cavity 18.

The area 136 around the orifice 132 defines a seat for the plunger seal 94. In many instances, the dimensions of the orifice 132 and/or the seating area 136 must be very precise, and within very tight tolerances, to insure the necessary accuracy of flow rate and/or other flow parameters, and this preciseness must be maintained throughout the life of the valve/vessel. Particularly, for example, the diameter of the orifice 136 and the curvature of the surrounding edge, are often critical to obtaining correct flow characteristics. For these reason, the orifice-carrying component can be made of a durable corrosion-resisting material, such as stainless steel to insure and/or prolong the life of the valve 10.

The illustrated capsule 50 comprises a podium 140, a cup/member engaging portion 142 below the podium 140, and a pedestal 144 below the portion 142. A groove 146 is situated between the portion 142 and the pedestal 144 for receipt of the seal 56. The outlet passage 130 can comprise a top section extending through the podium 140 and flaring into a wider bottom section which extends through the cup/member engaging portion 142 and the pedestal 144.

The orifice 132 is located on the upper axial end of the podium 140 and the exit 134 is located on the lower axial end of the pedestal 144. In the assembled valve 10 and/or vessel 42, the seating podium 140 is positioned just within the tube 70 and within the holding chamber 62. An upper region of the engaging portion 142 is surrounded by the inner cylindrical wall 112 of the inlet cup 48. When the valve 10 and/or vessel 42 is installed on the receiving member 12, a lower region of the engaging portion 142 is surrounded by the lower cylindrical wall 32 of the interfacing cavity 18. The bottom axial end of the pedestal 144 is abutted against the bottom wall 32 of the interfacing cavity 18 and the exit 134 is aligned with the delivery passage 36. The seal 56, situated within the groove 146, prevents fluid from leaking between the member-pedestal interface and into the annular chamber 116 of the inlet cup 48.

The relative positioning between the receiving member 12 and the vessel 42, advantageously effects package size. Particularly, for example, the exit 134 is positioned below the threaded boss 84. This allows the valve 10 and/or the vessel 42 to maintain the same (or almost the same) package height as when the orifice is part of the receiving member 12.

To assemble the flow-controlling vessel 42, the capsule 50 can be press-fit into the inlet cup 48 and then these two components 48/50 can be press-fit into the inner surface 88 of the sleeve flange 74. The inlet cup 48 can be otherwise attached to the sleeve 44 and/or the capsule 50 can be otherwise attached to the cup 48. Additionally or alternatively, the inlet cup 48 can be formed in one piece with the sleeve flange 74 in which case the orifice insert would comprise only the capsule 50. The inlet cup 48 can be formed in one piece with the capsule 50, keeping in mind that this might result in the inlet cup 48 being unnecessarily made of an expensive long-life material. In any event, other attachment methods are certainly possible and contemplated, with non-threaded attachments being preferred in the interest of reducing tooling costs.

It may be noted that the relevant geometry for the incorporation of the orifice insert 48/50 is dependent upon the external dimensions of the outer wall 112 of the inlet cup 48 and the cup-engaging portion 142 of the capsule 50. A wide range of passage, orifice, and/or outlet dimensions can be provided within the capsule body 128 without changing these external dimensions. This allows different orifice inserts, or even just different capsules, to be used with the same vessel design to allow modular manufacturing and/or field flow adjustments.

In the illustrated embodiment, the orifice 132 formed the outlet 64 from the fluid chamber 62, and the opposite end of the passage 130 formed the exit 134 of the passage 130. Additionally, the openings 118 in the cup 48 formed the inlet 60 into the fluid chamber 62. Also in the illustrated embodiment, the valve 10 has a normally-closed design, with the plunger 46 being biased to its closed position, and moving to the opened position upon energization of the solenoid assembly 40.

However, in certain applications, the orifice 132 could form the inlet to the fluid chamber 62, the opposite end of the passage 130 could form its entrance, and the opening 118 in the cup 48 could form the outlet from the fluid chamber 62. In the latter case, the passage 36 in the valve-interfacing cavity 18 would communicate with one or more supply lines, and the passage 36 would communicate with one or more delivery lines. Additionally or alternatively, the plunger 46 could be biased to an opened position (e.g., the valve 10 could have a normally-open design), with the energization of the solenoid assembly 40 moving it to the closed position.

Although this disclosure has shown and described a certain embodiment or embodiments, it is obvious that equivalent alterations and modifications will occur to others skilled in the art upon the reading and understanding of this specification and the annexed drawings. In regard to the various functions performed by the above described elements (e.g., components, assemblies, systems, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function. In addition, while a particular feature may have been described above with respect to only one or more of several illustrated embodiments, such feature may be combined with one or more other features of the other embodiments, as may be desired and advantageous for any given or particular application. Furthermore, directional modifiers (e.g., upper, top, lower, bottom, above, below, left-hand, right-hand, etc.) are used only for ease in explanation in connection with the illustrated orientation and do not, unless otherwise indicated, limit the elements to any specific orientation.

The invention claimed is:

1. A flow-directing vessel for installation into an interfacing cavity having a cylindrical wall with a threaded portion, a supply passage located below the threaded portion, and a delivery passage located below the threaded portion;
   the vessel comprising a sleeve, a plunger movable relative to the sleeve, a cup fixedly attached to the sleeve, and a capsule fixedly attached to the cup;
   the sleeve having a threaded portion for mating with the threaded wall of the interfacing cavity to connect the vessel to the interfacing cavity,
   the cup having a U-shape cross-section formed by radially spaced apart inner and outer walls, and an upper axial wall extending between and connecting the inner and outer walls, the upper axial wall including at least one opening, wherein the inner and outer walls and the upper axial wall define a chamber that opens downwardly for communication with the supply passage;
   the capsule comprising an orifice in communication with the at least one opening in the upper axial wall, an exit for communication with the delivery passage, and a passageway from the orifice to the exit;
   the plunger sealing and unsealing the orifice to thereby seal and unseal the passageway from the orifice to the exit such that when the passageway is unsealed, fluid from the supply passage can enter the chamber and pass through the at least one opening in the upper axial wall to the orifice and then through the orifice into the passageway to the exit.

2. A flow-directing vessel as set forth in claim 1, wherein the cup and the capsule are not formed in one piece with each other.

3. A flow-directing vessel as set forth in claim 2, wherein the cup is press-fit into the sleeve and wherein the capsule is press-fit into the cup.

4. A flow-directing vessel as set forth in claim 2, wherein the capsule is a one-piece body and the cup is one-piece body.

5. A flow-directing vessel as set forth in claim 4, wherein the cup and the capsule are not made of the same material and wherein the capsule is made of a durable corrosion-resistant material.

6. A flow-directing vessel as set forth in claim 1, wherein the cup surrounds the capsule.

7. A flow-directing vessel as set forth in claim 1 and a solenoid assembly controlling movement of the plunger.

8. A flow-directing vessel as set forth in claim 1, wherein a solenoid assembly mechanically biases the plunger to a closed position sealing the orifice and, when energized, moves to the plunger to an opened position unsealing the orifice.

9. A flow-directing vessel as set forth in claim 1 and a receiving member comprising an interfacing cavity;
   the interfacing cavity comprising a cylindrical wall with a threaded portion, a bottom wall structure below the threaded portion in the cylindrical wall, a supply passage situated in the bottom wall structure, and a delivery passage situated in the bottom wall structure;
   the sleeve's threaded portion engaging the threaded portion of the cylindrical wall of the interfacing cavity; and
   the chamber communicating with the supply passage and the exit communicating with the delivery passage.

10. A flow-directing vessel as set forth in claim 1 and a receiving member comprising an interfacing cavity;
    the interfacing cavity comprising a cylindrical wall with a threaded portion, a bottom wall structure below the threaded portion in the cylindrical wall,
    the bottom wall structure comprising a first bottom wall and a second bottom wall positioned at different heights relative to the cylindrical wall;
    the interfacing cavity having a supply passage situated in the first bottom wall and a delivery passage situated in the second bottom wall;
    the sleeve's threaded portion engaging the threaded portion of the cylindrical wall of the interfacing cavity; and
    the chamber communicating with the supply passage and the exit communicating with the delivery passage.

11. The flow-directing vessel of claim 1, wherein the cup is fixedly attached to the sleeve by engaging the outer wall of the cup to an inner wall surface of the sleeve, and the capsule is fixedly attached to the cup by engaging the inner wall of the cup to an outer wall surface of the capsule.

12. A flow-directing vessel as set forth in claim 1 the cup further comprising at least one rounded shoulder between the inner wall and the upper axial wall or between the outer wall and the upper axial wall.

13. A flow-directing vessel for installation into an interfacing cavity having a cylindrical wall with a threaded portion, a supply passage located below the threaded portion, and a delivery passage located below the threaded portion;
    the vessel comprising a sleeve, a plunger movable relative to the sleeve, a cup fixedly attached to the sleeve, and a capsule fixedly attached to the cup;

the sleeve having a threaded portion for mating with the threaded wall of the interfacing cavity to connect the vessel to the receiving member, the cup having a U-shape cross-section formed by radially spaced apart inner and outer walls and an upper axial wall extending between and connecting the inner and outer walls, the upper axial wall including at least one opening, wherein the inner and outer walls and the upper axial wall define a chamber that opens downwardly for communication with the delivery passage;

the capsule comprising an orifice for communication with the at least one opening in the upper axial wall, an entrance for communication with the supply passage, and a passageway from the entrance to the orifice;

the plunger sealing and unsealing the orifice to thereby seal and unseal the passageway from the entrance to the orifice such that when the orifice is unsealed, fluid from the supply passage can enter the passageway through the entrance and pass through the orifice to the at least one opening in the upper axial wall and then into the chamber to the delivery passage.

14. A flow-directing vessel as set forth in claim 13, wherein the cup and the capsule are not formed in one piece with each other.

15. A flow-directing vessel as set forth in claim 14, wherein the cup is press-fit into the sleeve and wherein the capsule is press-fit into the cup.

16. A flow-directing vessel as set forth in claim 14, wherein the capsule is a one-piece body and the cup is one-piece body.

17. A flow-directing vessel as set forth in claim 16, wherein the cup and the capsule are not made of the same material and wherein the capsule is made of a durable corrosion-resistant material.

18. A flow-directing vessel as set forth in claim 13, wherein the cup surrounds the capsule.

19. A flow-directing vessel as set forth in claim 13 and a solenoid assembly controlling movement of the plunger.

20. A flow-directing vessel as set forth in claim 13, wherein a solenoid assembly mechanically biases the plunger to a closed position sealing the orifice and, when energized, moves to the plunger to an opened position unsealing the orifice.

21. A flow-directing vessel as set forth in claim 13 and a receiving member comprising an interfacing cavity;

the interfacing cavity comprising a cylindrical wall with a threaded portion, a bottom wall structure below the threaded portion in the cylindrical wall, a supply passage situated in the bottom wall structure, and a delivery passage situated in the bottom wall structure;

the sleeve's threaded portion engaging the threaded portion of the cylindrical wall of the interfacing cavity; and the chamber communicating with the delivery passage and the entrance communicating with the supply passage.

22. A flow-directing vessel as set forth in claim 13 and a receiving member comprising an interfacing cavity;

the interfacing cavity comprising a cylindrical wall with a threaded portion, a bottom wall structure below the threaded portion in the cylindrical wall, the bottom wall structure comprising a first bottom wall and a second bottom wall positioned at different heights relative to the cylindrical wall;

the interfacing cavity having a supply passage situated in the first bottom wall and a delivery passage situated in the second bottom wall;

the sleeve's threaded portion engaging the threaded portion of the cylindrical wall of the interfacing cavity; and the chamber communicating with the supply passage and the entrance communicating with the delivery passage.

23. A flow-directing vessel for installation into an interfacing cavity having a cylindrical wall, a first passage located below the cylindrical wall, and a second passage located below the cylindrical wall;

the vessel comprising a sleeve, a plunger movable relative to the sleeve, a cup fixedly attached to the sleeve, and a capsule fixedly attached to the cup;

the sleeve having a mating portion for mating with the cylindrical wall of the interfacing cavity to connect the vessel to the receiving member, the cup comprising a U-shape cross-section formed by radially spaced apart inner and outer walls and an upper axial wall extending between and connecting the inner and outer walls, the upper axial wall having at least one opening, wherein the inner and outer walls and the upper axial wall define a chamber that opens downwardly and defines an inlet or outlet for communication with the first passage;

the capsule comprising an orifice for communication with the at least one opening in the upper axial wall, an exit or entrance for communication with the second passage, and a passageway therebetween;

the plunger sealing and unsealing the orifice to thereby seal and unseal the passageway between the orifice and exit or entrance such that when the orifice is unsealed the inlet or outlet of the chamber is in communication with the entrance or exit of the capsule through a flow path defined by the chamber, the opening in the upper axial wall, the orifice and the passageway.

* * * * *